US012798199B2

(12) United States Patent
He et al.

(10) Patent No.: US 12,798,199 B2
(45) Date of Patent: Nov. 17, 2026

(54) METHOD FOR STAMPING AND INTEGRALLY MOLDING TOP COVER SHEET, BATTERY TOP COVER STRUCTURE AND MANUFACTURING METHOD THEREOF

(71) Applicant: NINGBO ZHENYU TECHNOLOGY CO., LTD., Ningbo (CN)

(72) Inventors: Shiya He, Ningbo (CN); Hang Liu, Ningbo (CN)

(73) Assignee: NINGBO ZHENYU TECHNOLOGY CO., LTD., Ningbo (CN)

( * ) Notice: Subject to any disclaimer, the term of this patent is extended or adjusted under 35 U.S.C. 154(b) by 866 days.

(21) Appl. No.: 18/307,833

(22) Filed: Apr. 27, 2023

(65) Prior Publication Data

US 2023/0256687 A1 Aug. 17, 2023

(30) Foreign Application Priority Data

Oct. 17, 2022 (CN) ......................... 202211264323.2

(51) Int. Cl.

*B29C 69/02* (2006.01)
*B21D 35/00* (2006.01)
*B29C 45/14* (2006.01)
*H01M 10/0525* (2010.01)
*H01M 50/103* (2021.01)

(Continued)

(52) U.S. Cl.

CPC ............. *B29C 69/02* (2013.01); *H01M 50/15* (2021.01); *B21D 35/001* (2013.01); *B29C 45/14* (2013.01); *H01M 10/0525* (2013.01); *H01M 50/103* (2021.01); *H01M 50/147* (2021.01);

(Continued)

(58) Field of Classification Search

CPC .. H01M 50/15; H01M 50/103; H01M 50/154; H01M 50/164; H01M 50/176; H01M 50/3425; H01M 50/55; H01M 50/553; H01M 50/567; H01M 50/188; H01M 50/564; H01M 50/627; H01M 50/148; H01M 50/166; H01M 50/342; H01M 50/147; H01M 50/159;

(Continued)

(56) References Cited

U.S. PATENT DOCUMENTS

2016/0365547 A1 12/2016 Li et al.
2018/0138489 A1 5/2018 Wang et al.

(Continued)

FOREIGN PATENT DOCUMENTS

CN 208690318 * 4/2019
CN 214625197 * 11/2021
CN 214797654 * 11/2021

*Primary Examiner* — Matthew W Van Oudenaren

(57) ABSTRACT

The disclosure relates to the field of new energy lithium battery accessories, and specifically relates to a method for stamping and integrally molding a top cover sheet, a battery top cover structure and a manufacturing method thereof. In the disclosure, the top cover sheet is stamped to mold corresponding holes, and then the top cover sheet is forward stamped, reversely stamped and shaped so as to obtain a battery top cover sheet with a predetermined shape. In the disclosure, an injection molding connecting portion is integrally molded on the battery top cover sheet by a stamping molding process for injection molding of an upper plastic piece, so as to facilitate the manufacture of the top cover sheet and the battery top cover structure.

10 Claims, 15 Drawing Sheets

(51) Int. Cl.
*H01M 50/147* (2021.01)
*H01M 50/148* (2021.01)
*H01M 50/15* (2021.01)
*H01M 50/166* (2021.01)

(52) U.S. Cl.
CPC ........ *H01M 50/148* (2021.01); *H01M 50/166* (2021.01); *H01M 2220/20* (2013.01)

(58) Field of Classification Search
CPC ........... H01M 50/174; H01M 10/0525; H01M 2220/20; B21D 35/001; B29C 45/14
See application file for complete search history.

(56) References Cited

U.S. PATENT DOCUMENTS

2019/0109302 A1* 4/2019 Zheng ................. H01M 50/567
2019/0115568 A1 4/2019 Li et al.

* cited by examiner

METHOD FOR STAMPING AND INTEGRALLY MOLDING TOP COVER SHEET, BATTERY TOP COVER STRUCTURE AND MANUFACTURING METHOD THEREOF

TECHNICAL FIELD

The discloses relates to the field of new energy lithium battery accessories, and specifically relates to a method for stamping and integrally molding a top cover sheet, a battery top cover structure and a manufacturing method thereof.

BACKGROUND

Power battery is an important component of new energy vehicles. The existing new energy vehicles mostly use lithium-ion batteries as power batteries. For power lithium batteries, in addition to key components such as battery cells and BMS, battery case structure is also an important safety factor. Among them, terminal is an integral part of a battery module. In addition to being connected to a positive electrode and a negative electrode of a battery cell in the module for electrical conductivity, the terminal also needs to have corresponding structural strength and sealing requirements to meet the requirements of vehicles.

Therefore, the structure of a battery top cover on which the terminal is fixed is particularly important.

SUMMARY

The object of the disclosure is to provide a method for stamping and integrally molding a stamped and integrally molded top cover sheet, as well as a battery top cover structure and a method for manufacturing the battery top cover structure.

A method for stamping and integrally molding a top cover sheet, comprises the following steps:

- step S11: stamping a top cover sheet to mold a first through hole arranged in a penetrating manner and counterbores arranged around the first through hole in a non-penetrating manner;
- step S12: stamping the top cover sheet from bottom to top to mold a cylindrical convex hull, and locating the first through hole on a top surface of the convex hull;
- step S13: reversely stamping the convex hull from top to bottom to mold the convex hull into a convex hull bottom and a convex hull wall convexly provided around the convex hull bottom, and form the counterbores into an undercut groove on an outer side wall of the convex hull wall; and
- step S14: performing primary shaping on the convex hull wall to mold the convex hull wall into a convex hull connecting portion and a convex hull ring with the convex hull ring connected to the convex hull connecting portion and bent inward; and molding the convex hull bottom and the first through hole into a terminal positioning stage and a terminal hole respectively.

According to the method for stamping and integrally molding a top cover sheet, in the step S11, the top cover sheet is stamped to mold a second through hole arranged in a penetrating manner; in the step S12, the second through hole is stamped from bottom to top so that the second through hole is raised to form a valve hole boss; in the step S13, the top cover sheet is stamped from top to bottom to mold an electrolyte injection port; and the step S13 is followed by a step S131 at which the valve hole boss is stamped from top to bottom to sink a middle area thereof.

According to the method for stamping and integrally molding a top cover sheet, in the step S11, the top cover sheet is stamped from bottom to top to mold an explosion-proof valve boss on the top cover sheet; in the step S13, the explosion-proof valve boss is stamped from top to bottom to stamp the explosion-proof valve boss downward to mold a valve groove portion and a side ring portion and mold a recessed ring mouth portion on the side ring portion, and the top cover sheet is stamped from top to bottom to mold the electrolyte injection port; and in the step S131, a C-shaped thinning portion is molded on the valve groove portion.

According to the method for stamping and integrally molding a top cover sheet, in the step S14, a plurality of plastic piece concave holes are molded on a bottom surface of the top cover sheet; and in the step S14, an outer side of the convex hull connecting portion is stamped to form a concave ring.

According to the method for stamping and integrally molding a top cover sheet, at least three counterbores are evenly distributed along a circumference According to the method for stamping and integrally molding a top cover sheet, in the step S12, the first through hole is located at a center of the top surface of the convex hull after the stamping.

A method for manufacturing a top cover structure, comprises the following steps:

- configuring the top cover structure to comprise a top cover sheet and a positive terminal assembly or a negative terminal assembly arranged on the top cover sheet; where the positive terminal assembly or the negative terminal assembly comprises a seal, a terminal and an upper plastic piece, the seal, the terminal and the upper plastic piece are arranged above the top cover sheet sequentially from bottom to top, the terminal and the seal are prefabricated and then assembled to the top cover sheet, and the upper plastic piece is injection molded on the top cover sheet.
- Step S1: performing stamping and molding to mold the top cover sheet, where the top cover sheet is manufactured by any of the method for stamping and integrally molding a top cover sheet.
- Step S2: assembling the terminal and the seal to a terminal mounting position of the top cover sheet.
- Step S3: performing injection molding at the terminal mounting position and performing cooling and shaping to obtain the upper plastic piece; during the injection molding process, applying a pressure to the terminal so that the seal is in a compression deformation state until the cooling and shaping; and a fastener is formed in an undercut groove when the upper plastic piece is injection molded.

According to the method for manufacturing a top cover structure, a step S21 is provided between the step S2 and the step S3, and the step S21 comprises secondary shaping of an injection molding connecting portion at which the injection molding connecting portion is stamped inward for shaping so that a mouth size thereof is smaller than a diameter of the terminal or a convex hull ring is bent so that the mouth size thereof is smaller than the diameter of the terminal According to the method for manufacturing a top cover structure, a step S31 and a step S4 are provided after the step S3.

- Step S31: assembling an explosion-proof valve at which an explosion-proof valve plate is assembled from bottom to top to an explosion-proof valve hole arranged on the top cover sheet and is welded for fixing, and then a film is attached to the explosion-proof valve hole from top to bottom.

Step S4: assembling a lower plastic piece at which the lower plastic piece is assembled to a lower surface of the top cover sheet from bottom to top.

According to the method for manufacturing a top cover structure, the explosion-proof valve hole comprises an explosion-proof valve boss formed by being convexly arranged relative to an upper surface of the top cover sheet, the explosion-proof valve boss is concavely provided with a first pit, and the explosion-proof valve boss is recessed relative to the upper surface of the top cover sheet for arranging the explosion-proof valve plate therein.

According to the method for manufacturing a top cover structure, the explosion-proof valve plate is integrally molded on the top cover plate, and a periphery of the top cover plate is provided with the explosion-proof valve boss convexly arranged relative to the upper surface of the top cover sheet, the explosion-proof valve boss is provided with an exhaust groove, and the film is attached to the explosion-proof valve boss.

According to the method for manufacturing a top cover structure, the top cover sheet is an integral top cover sheet, and one terminal mounting position is respectively arranged on both sides thereof, and the explosion-proof valve and an electrolyte injection port are provided between the two terminal mounting positions.

According to the method for manufacturing a top cover structure, the top cover sheet is a split-type top cover sheet and comprises a positive electrode top cover sheet and a negative electrode top cover sheet, the positive electrode top cover sheet and the negative electrode top cover sheet are respectively provided with the positive terminal assembly and the electrolyte injection port, as well as the negative terminal assembly and the explosion-proof valve.

According to the method for manufacturing a top cover structure, the lower plastic piece is arranged under the top cover sheet.

A battery top cover structure manufactured according to the method for manufacturing a top cover structure.

The method for stamping and integrally molding the top cover sheet and the battery top cover structure and a manufacturing method thereof of the disclosure have the following beneficial effects:

1. The top cover sheet is pre-stamped to obtain corresponding holes, and then sequentially forward stamped, reversely stamped and shaped to obtain a battery top cover sheet with a predetermined structure.
2. After the terminal and the seal are assembled to the top cover sheet, the injection molding connecting portion is subject to secondary shaping treatment, and injection molding is performed to form the upper plastic piece, so that the terminal is firmly fixed to the top cover sheet, and the explosion-proof valve structure or the lower plastic piece is finally assembled to obtain the top cover structure.
3. The explosion-proof valve structure integrally molded on the top cover sheet or welded on the top cover sheet has the explosion-proof valve boss convexly arranged relative to the top cover sheet so as to avoid entering the explosion-proof valve when filling an electrolyte.

Figure 1:
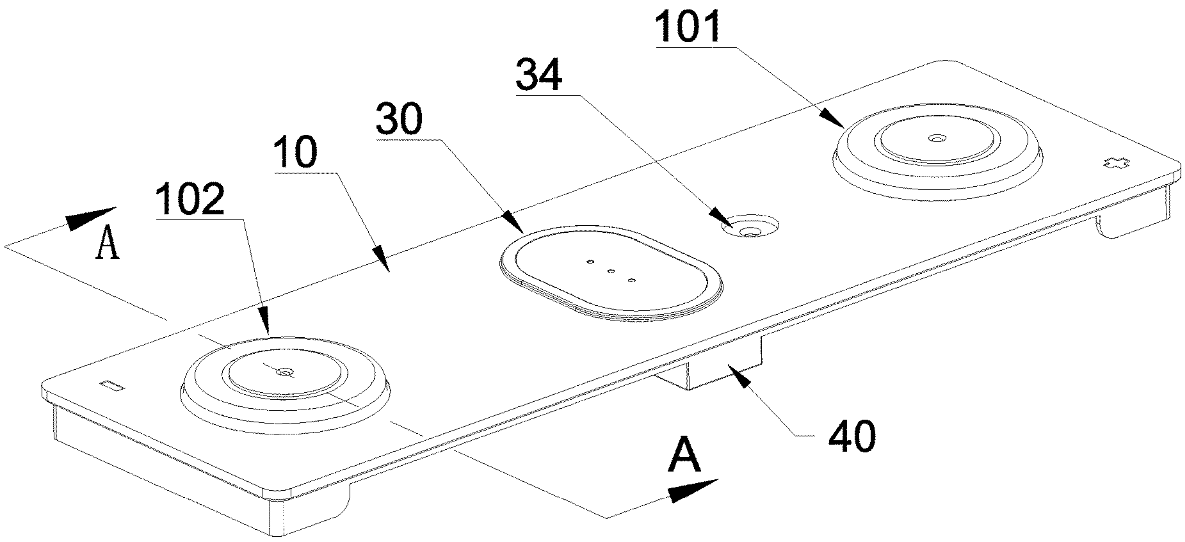
FIG. 1 is a schematic structural view of a battery top cover structure according to embodiment 1 of the disclosure, with the middle of an A-A section line connected by a dotted line to facilitate understanding of the position of the A-A section.

Reference numerals in the drawings: top cover sheet 10, terminal mounting position 11, injection molding connecting portion 12, terminal 21, seal 22, upper plastic piece 23, gap 24, explosion-proof valve 30, explosion-proof valve hole 31, explosion-proof valve plate 32, film 33, electrolyte injection port 34, lower plastic piece 40, lower plastic connecting piece 41, positive terminal assembly 101, negative terminal assembly 102, counterbore 103, first through hole 104, convex hull 105, convex hull wall 106, convex hull bottom 107, second through hole 109, convex hull connecting portion 121, convex hull ring 122, undercut groove 123, concave ring 124, terminal positioning stage 125, terminal hole 126, first pit 311, explosion-proof valve boss 312, second pit 313, and exhaust groove 314.

DESCRIPTION OF THE EMBODIMENTS

In order to enable those skilled in the art to better understand the disclosure and thereby define the scope of the disclosure more clearly, the disclosure is described below in detail with respect to some specific embodiments of the disclosure. It should be noted that the following description only describes some specific embodiments of the inventive concept and are only part of the embodiments of the disclosure, specific and direct descriptions of relevant structures are merely for the convenience of understanding the disclosure, and the specific features do not, of course, directly limit the implementation scope of the disclosure. Conventional choices and alternatives made by those skilled in the art under the guidance of the inventive concept should be considered within the scope of the disclosure.

Embodiment 1

As shown in FIG. 1, a battery top cover structure comprises a top cover sheet 10, as well as an explosion-proof valve 30, an electrolyte injection port 34, and a positive terminal assembly 101 and a negative terminal assembly 102 provided on the top cover sheet 10. In the present embodiment, two terminal assemblies (i.e., the positive terminal assembly 101 and the negative terminal assembly 102), the explosion-proof valve 30 and the electrolyte injection port 34 are respectively arranged on the same top cover sheet 10, thereby forming an integral top cover structure, that is, the top cover structure in which a positive electrode and a negative electrode of a battery are located on the same top cover sheet. Of course, in other embodiments, the above-mentioned four components can also be respectively arranged on two top cover sheets 10 so as to form a split-type top cover structure in which the positive electrode and the negative electrode are separately arranged. For example, the electrolyte injection port 34 and the negative terminal assembly 102 are arranged on one top cover sheet 10, and the explosion-proof valve 30 and the positive terminal assembly 101 are arranged on another top cover sheet 10.

Figure 2:
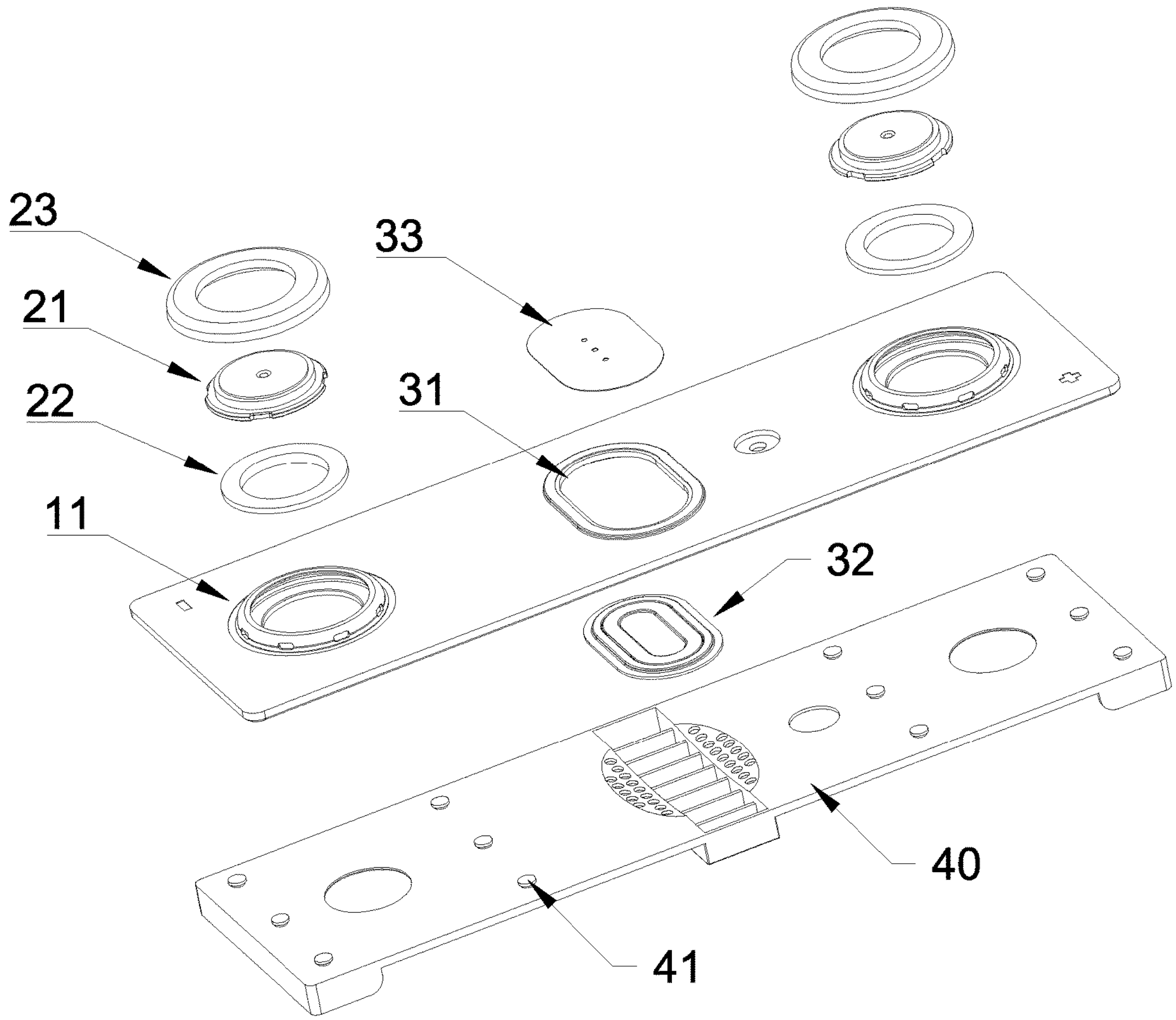
FIG. 2 is a structural exploded view of FIG. 1.

In the present embodiment, a lower plastic piece 40 is provided under the top cover sheet 10 and is made of an insulating plastic piece, so that the top cover sheet 10 is connected to a battery case in an insulated manner. As shown in FIG. 2, the lower plastic piece 40 is provided with a plurality of lower plastic connecting pieces 41, the lower plastic piece 40 is molded in advance, and then the lower plastic connecting pieces 41 arranged on an upper surface thereof are heated, and then fitted to an underside of the top cover sheet 10, so that the lower plastic connecting pieces 41 are cooled and shaped in corresponding concave holes on a lower surface of the top cover sheet 10 to complete their heat-fusion fixing. The plastic piece concave holes arranged on the lower surface of the top cover sheet 10 may have a T-shaped inner cavity respectively, so that the lower plastic connecting pieces 41 are fixed therein after cooling.

As shown in FIG. 2, the top cover sheet 10 is provided with two terminal mounting positions 11 for a positive terminal and a negative terminal to fit to form the positive terminal assembly 101 and the negative terminal assembly 102, and the explosion-proof valve 30 and the electrolyte injection port 34 are arranged between the two terminal mounting positions 11.

As shown in FIG. 2, the positive terminal assembly 101 and the negative terminal assembly 102 respectively comprise a seal 22, a terminal 21 and an upper plastic piece 23, which are all arranged above the top cover sheet 10 sequentially from bottom to top. The terminal 21 and the seal 22 are prefabricated and assembled to the top cover sheet 10, and the upper plastic piece 23 is formed by injection molding directly on the top cover sheet 10.

Figure 4:
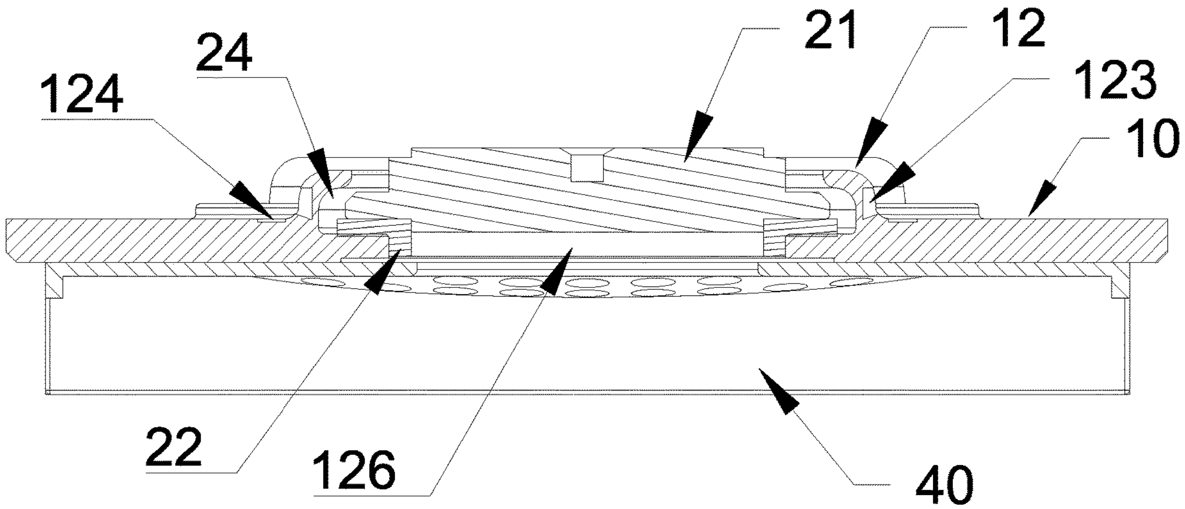
FIG. 4 is a sectional view along the A-A section with an upper plastic piece in the embodiment of FIG. 1 removed.

After the terminal 21 and the seal 22 are mounted at the terminal mounting position 11, a convex hull ring 122 is subjected to secondary molding and stamping to form a fit state as shown in FIG. 4. At this time, a gap 24 is formed between the terminal 21 and an injection molding connecting portion 12, and the gap 24 is filled during the injection molding to form a part of the upper plastic piece 23 to insulate the terminal 21 from the top cover sheet 10.

Then, injection molding is performed while maintaining a pressure on the terminal 21 to mold the upper plastic piece 23 thereon. The upper plastic piece 23 comprises the part formed by filling the gap 24 and a part formed outside the injection molding connecting portion 12, so as to completely wrap the injection molding connecting portion 12 therein, and a fastener is formed in an undercut groove 123 at an outer side wall of the injection molding connecting portion 12, so that the upper plastic piece 23 is firmly molded on the top cover sheet 10.

Therefore, a method for manufacturing the battery top cover structure comprises the following steps:

S1: performing stamping and molding to mold the top cover sheet 10.

S2: assembling the terminal 21 and the seal 22 to the terminal mounting position 11 of the top cover sheet 10, where the seal 22 and the terminal 21 can be assembled to the terminal mounting position 11 sequentially, or the seal 22 can be assembled to the terminal 21, and then both can be assembled to the terminal mounting position 11 as a whole. Before assembling, an inner diameter of a mouth of the injection molding connecting portion 12 is greater than or equal to an outer diameter of the terminal 21, so that the terminal 21 can be fitted in the injection molding connecting portion 12.

Of course, when the terminal 21 or the injection molding connecting portion 12 is arranged in other shapes other than circular shape, the purpose of allowing assembly can also be achieved through their relative positional relationship during assembly.

S21: performing secondary shaping on the injection molding connecting portion 12. That is, the injection molding connecting portion 12 can be further stamped inward for shaping so that a mouth size thereof is smaller than a diameter of the terminal 21; or the convex hull ring 122 can be further bent so that the mouth size thereof is smaller than the diameter of the terminal 21.

S3: performing injection molding at terminal mounting position 11, and performing cooling and shaping to obtain the upper plastic piece 23. In the whole process of injection molding, a pressure can be applied to the terminal 21 so that the seal 22 is in a compression deformation state during the injection molding process, and can be kept in the state after the upper plastic piece 23 is cooled, so that the seal can provide a good sealing effect between the terminal 21 and the top cover sheet 10.

S31: assembling the explosion-proof valve 30. An explosion-proof valve plate 32 is assembled from bottom to top to an explosion-proof valve hole 31 arranged on the top cover plate 10 and welded for fixing, and then a film 33 is attached to the explosion-proof valve hole 31 from top to bottom to cover the explosion-proof valve hole 31.

S4: assembling the lower plastic piece 40. This step is preferably realized by heat-fusion assembly.

Figure 5:
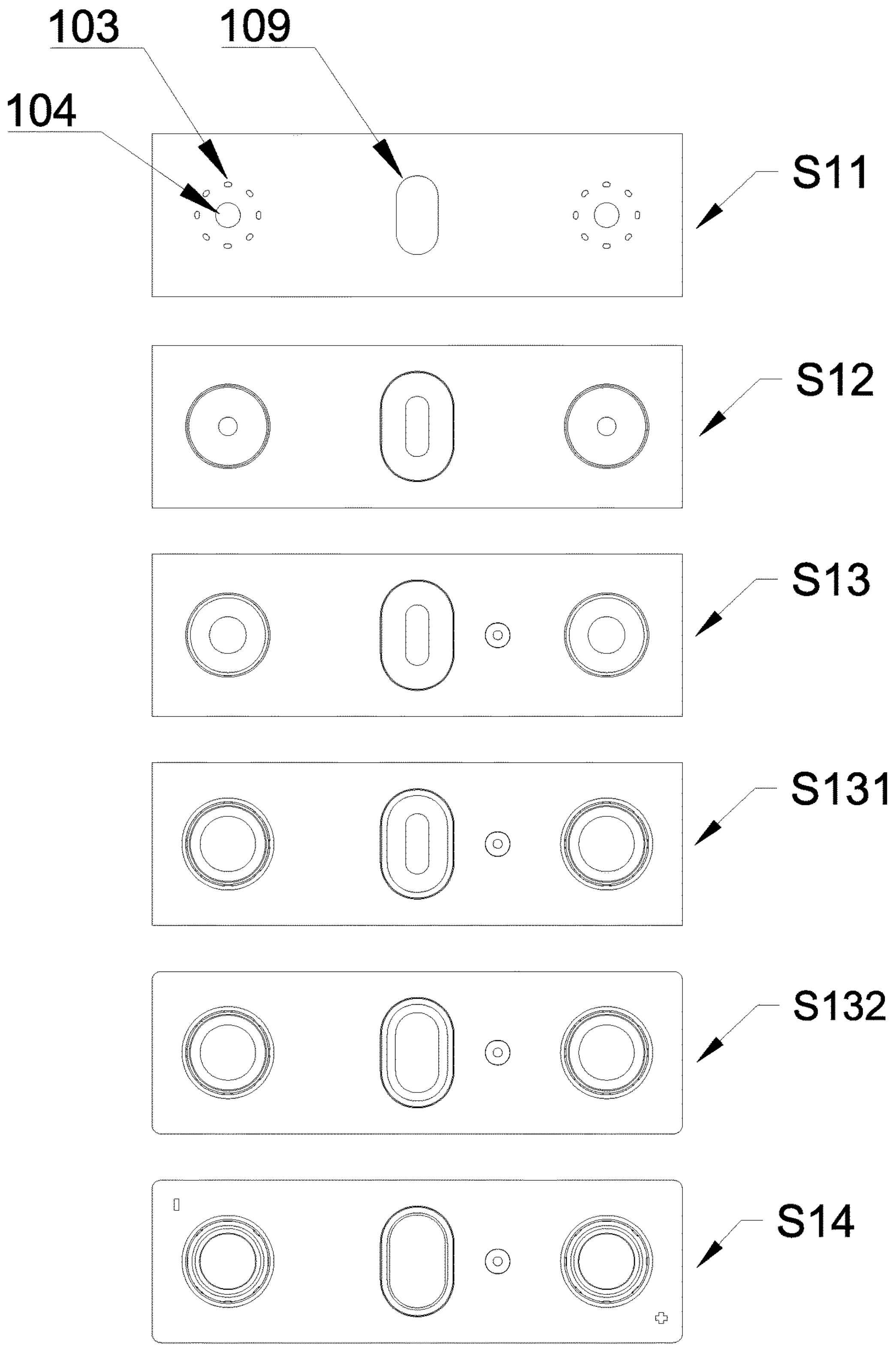
FIG. 5 is a schematic top view of steps in a molding process of the top cover sheet in the embodiment of FIG. 1.
Figure 6:
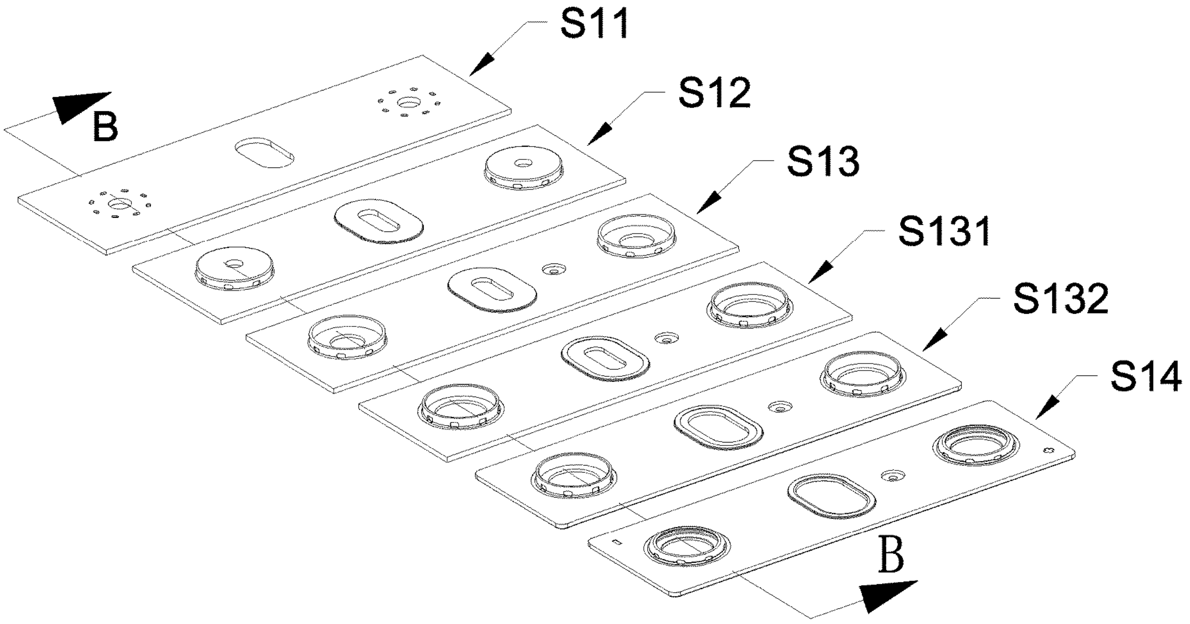
FIG. 6 is a 3D schematic diagram of FIG. 5, with the middle of a B-B section line also connected by a dotted line.

Among them, the step of stamping and molding the top cover sheet 10 in the step S1 is particularly important in the disclosure, and comprises the following specific steps, as shown in FIGS. 5 and 6.

Figure 7:
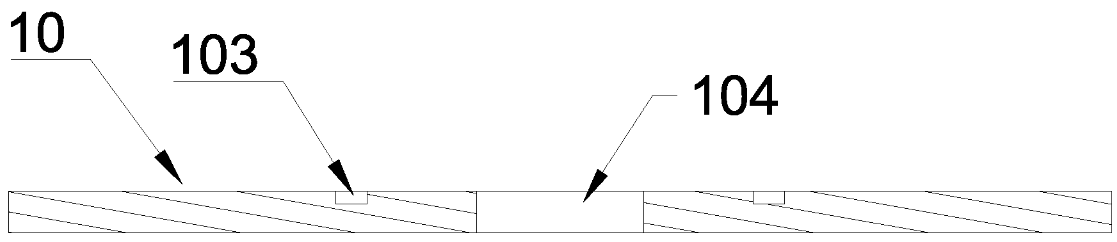
FIG. 7 is a sectional view of the top cover sheet in a step S11 along the B-B section at one terminal mounting position.

Step S11: performing stamping to mold a first through hole 104 and a second through hole 109, where the first through hole 104 is used for subsequent molding into a terminal hole 126, and the second through hole 109 is used for subsequent molding into the explosion-proof valve hole 31, as shown in FIG. 7. Moreover, counterbores 103 arranged in a penetrating manner are molded on a periphery of the first through hole 104, and the counterbores 103 are evenly distributed along a circumference. The area where the counterbores 103 are located is formed into a terminal hole processing position.

Figure 8:
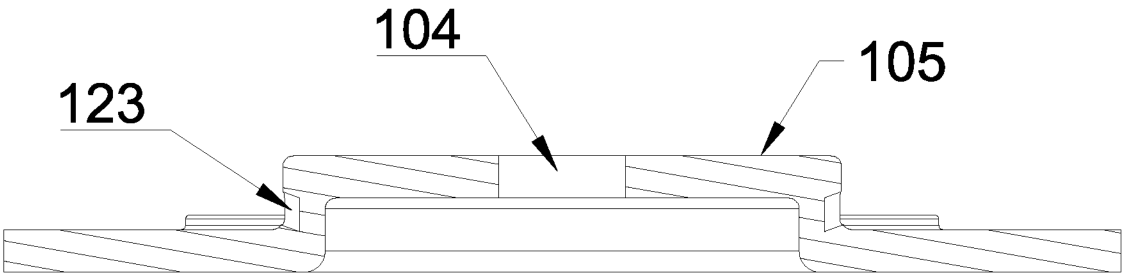
FIG. 8 is a sectional view of the top cover sheet in a step S12 along the B-B section at one terminal mounting position.

Step S12: stamping the terminal hole processing position from bottom to top to mold a cylindrical convex hull 105, as shown in FIG. 8. After the stamping, the first through hole 104 is located on a top surface of the cylinder of the convex hull 105, and the counterbores 103 are located on an outer wall of the cylinder, preferably at a bottom of the outer side wall. In this step, an area around the second through hole is also stamped from bottom to top so that the second through hole is raised to form a valve hole boss.

Figure 9:
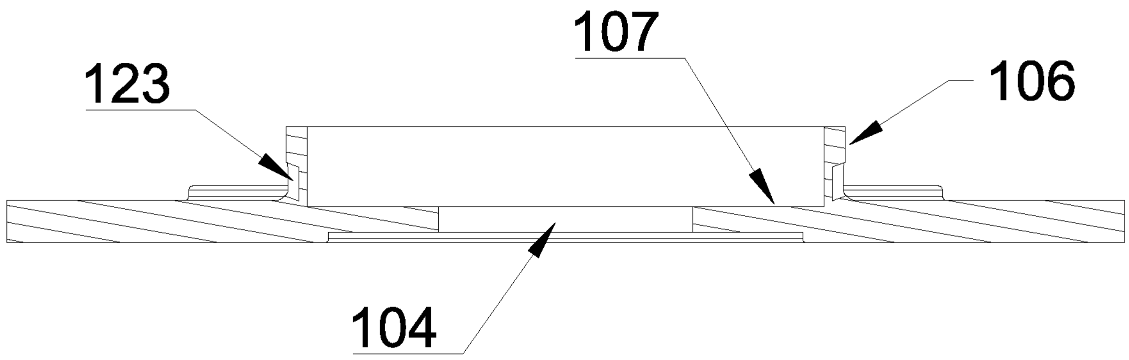
FIG. 9 is a sectional view of the top cover sheet in a step S13 along the B-B section at one terminal mounting position.

Step S13: reversely stamping the convex hull 105 (i.e., stamping from top to bottom) to mold the top surface of the convex hull 105 into a convex hull bottom 107, with a side wall or a part of the side wall of the convex hull 105 kept intact to form a convex hull wall 106, as shown in FIG. 9. In this step, the top cover sheet 10 is simultaneously stamped from top to bottom to mold the electrolyte injection port 34.

Figure 10:
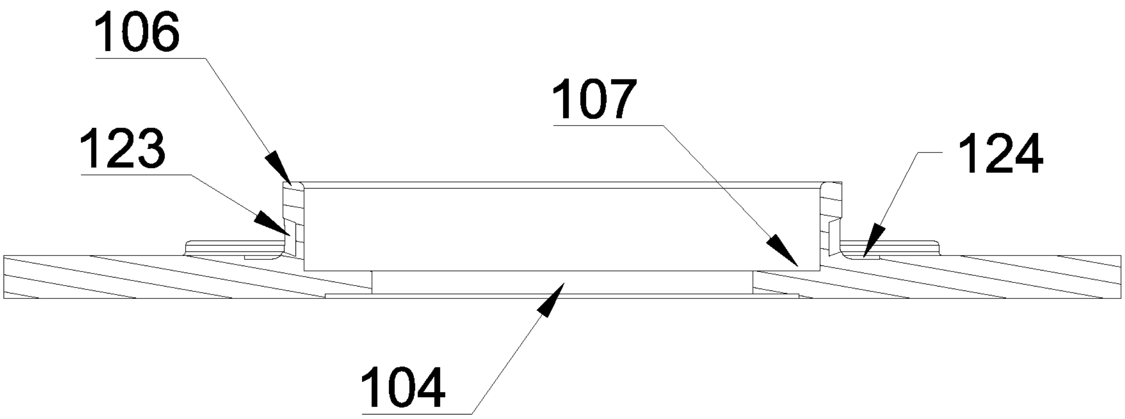
FIG. 10 is a sectional view of the top cover sheet in a step S131 along the B-B section at one terminal mounting position.

Step S131, stamping and shaping the convex hull bottom 107 and the convex hull wall 106 to enlarge the terminal hole in the middle of the convex hull bottom 107, as shown in FIG. 10. In this step, the valve hole boss is also stamped from top to bottom to sink a middle area thereof.

Figure 11:
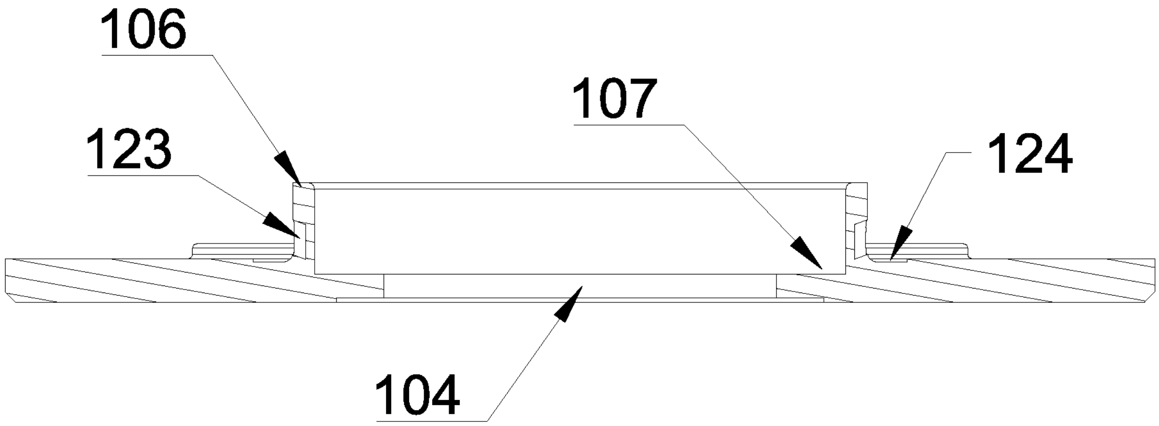
FIG. 11 is a sectional view of the top cover sheet in a step S132 along the B-B section at one terminal mounting position; compared with FIG. 10, the shape of the terminal mounting position has not changed in this step.

Step S132: as shown in FIG. 11, further shaping the valve hole boss, adjusting a size of the explosion-proof valve hole 31, and shaping the top cover sheet 10 (e.g., chamfering).

Figure 3:
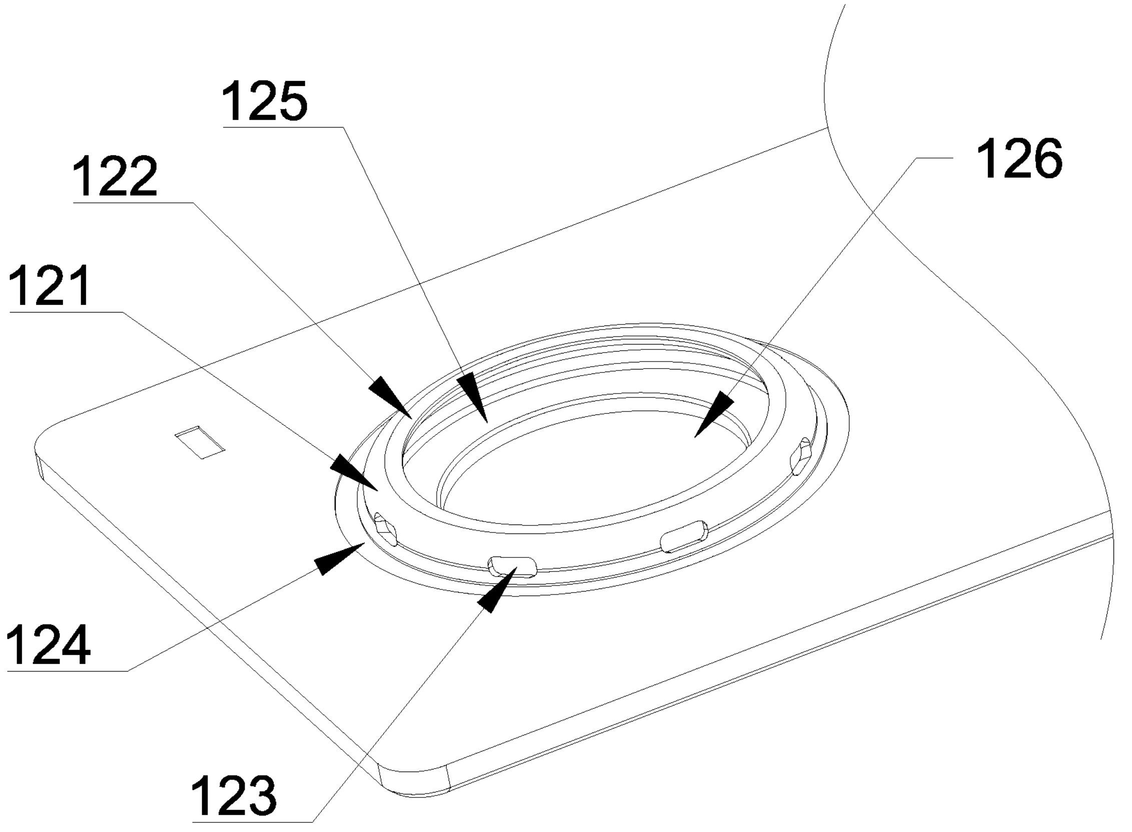
FIG. 3 is a partial schematic structural view of a top cover sheet in FIG. 1.
Figure 12:
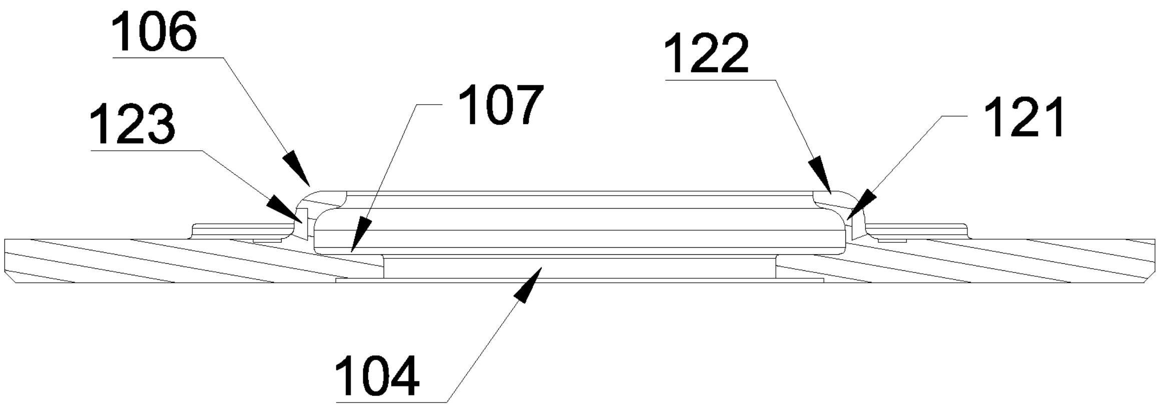
FIG. 12 is a sectional view of the top cover sheet in a step S14 along the B-B section at one terminal mounting position.

Step S14: performing shaping on the convex hull wall 106 (which can also be called primary shaping) to mold the convex hull wall 106 into a convex hull connecting portion 121 and a convex hull ring 122 connected to the convex hull connecting portion 121 and arranged inward, as shown in FIG. 12. The convex hull connecting portion 121 and the convex hull ring 122 are formed into the injection molding connecting portion 12, as shown in FIG. 4. Moreover, the convex hull bottom 107 and the first through hole 104 are molded into a terminal positioning stage 125 and the terminal hole 126 respectively, as shown in FIG. 3. In this step, the explosion-proof valve hole 31 of the valve hole boss is also shaped, so that the explosion-proof valve hole 31 is enlarged. Moreover, a plurality of plastic piece concave holes are molded on a bottom surface of the top cover sheet 10.

In addition, "+" and "–" are respectively marked on an upper surface of the top cover sheet 10 to mark polarity of the terminal corresponding to the terminal mounting position 11. Moreover, a concave ring 124 is formed by stamping an outer side of the convex hull connecting portion 121, and the concave ring 124 is used for the upper plastic piece 23 to fit therein during the injection molding. In this step, the explosion-proof valve hole is further shaped to finally form the explosion-proof valve hole 31 for arranging the explosion-proof valve plate 32.

In the present embodiment, since the fastener is formed in the undercut groove 123 during the injection molding of the upper plastic piece 23, the torsional performance of the upper plastic piece 23 is significantly improved.

Figure 13:
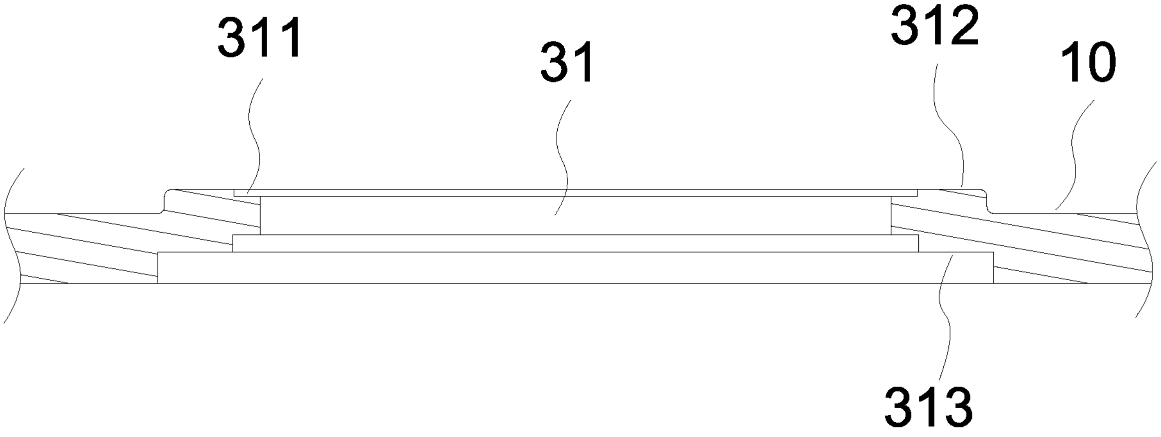
FIG. 13 is a cross-sectional view of an explosion-proof valve hole of the top cover sheet after the step S14 in the embodiment of FIG. 1, and it is a cross-sectional view of the B-B section line in FIG. 6 translated toward the middle to the explosion-proof valve hole.

In addition, as shown in FIG. 13, a first pit 311 is formed around an upper surface of the explosion-proof valve hole 31, and is used for the film 33 to fit therein when the film is attached, so that the film 33 is positioned and mounted more accurately. The explosion-proof valve boss 312 convexly arranged relative to the upper surface of the top cover sheet 10 can also prevent the electrolyte from entering the explosion-proof valve 30 during filling. A second pit 313 arranged on a lower surface of the explosion-proof valve hole 31 allows the explosion-proof valve plate 32 to be sunken relative to the lower surface of the top cover sheet 10, thereby the explosion-proof valve plate 32 can be better protected, and be prevented from being damaged due to collision of a battery cell and the like.

Embodiment 2

Figure 14:
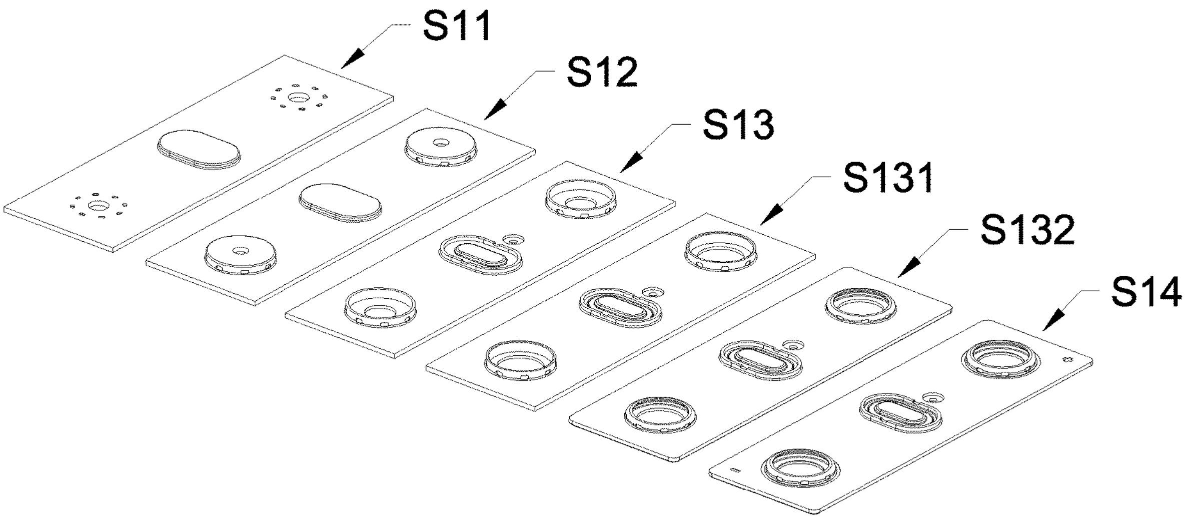
FIG. 14 is a 3D schematic diagram of steps in a molding process of a top cover sheet according to Embodiment 2 of the disclosure, and the top cover sheet has an overall structure similar to that of embodiment 1 and differs from embodiment 1 in that an explosion-proof valve plate is integrally molded at the explosion-proof valve hole in the present embodiment.

As shown in FIG. 14, a battery top cover structure has the same main structure as that of Embodiment 1, except that the explosion-proof valve plate 32 in the present embodiment is integrally molded on the top cover sheet 10.

Therefore, the steps S11-S14 differ with respect to the molding process of the explosion-proof valve.

In the present embodiment, the procedures of processing the terminal hole and the electrolyte injection port in the steps are exactly the same as those in Embodiment 1, and will not be repeated here. The process for molding the explosion-proof sheet in the present embodiment is mainly illustrated below.

In the step S11, stamping is performed from bottom to top to mold an explosion-proof valve boss on the top cover sheet 10.

In the step S12, the explosion-proof valve boss molded in S11 remains intact, that is, no processing.

In the step S13, stamping is performed from top to bottom to stamp the explosion-proof valve boss to mold a valve groove portion and a side ring portion, and a ring mouth portion is provided as an exhaust groove on the side ring portion.

In the step S131, a C-shaped thinning portion, such as an indentation, is molded on the valve groove portion.

In the steps S132 and S14, no processing is performed on the explosion-proof valve.

Figure 15:
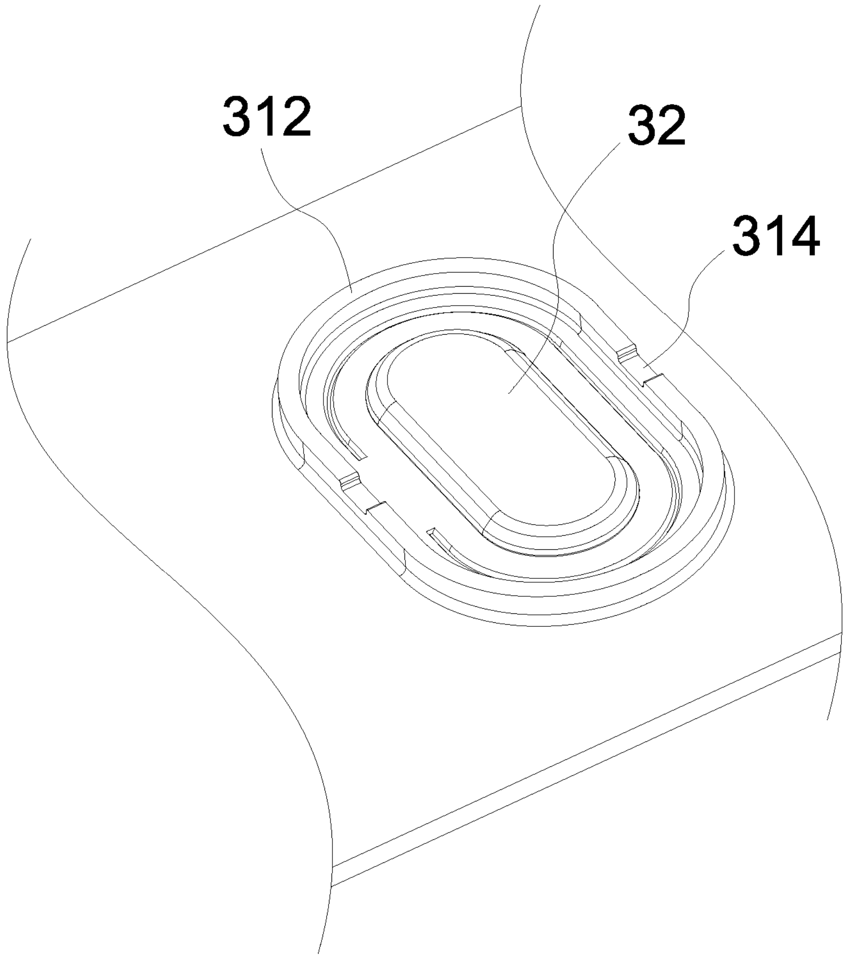
FIG. 15 is a partial schematic structural view of the explosion-proof valve of the top cover sheet after the step S14 in the embodiment of FIG. 14.

As shown in FIG. 15, in the present embodiment, the explosion-proof valve boss 312 convexly arranged relative to the upper surface of the top cover sheet 10 is formed on an outer side of the explosion-proof valve sheet 32 integrally molded on the top cover sheet 10. The explosion-proof valve boss 312 is provided with an exhaust groove 314, and the film 33 is attached to the explosion-proof valve boss 312 to cover the explosion-proof valve plate 32.

What is claimed is:

1. A method for stamping and integrally molding a top cover sheet, comprising the following steps:

step S11: stamping a top cover sheet to mold a first through hole arranged in a penetrating manner and counterbores arranged around the first through hole in a non-penetrating manner;

step S12: stamping the top cover sheet from bottom to top to mold a cylindrical convex hull, and locating the first through hole on a top surface of the cylindrical convex hull and the counterbores on a side wall of the cylindrical convex hull;

step S13: stamping the cylindrical convex hull from top to bottom to mold the cylindrical convex hull into a convex hull bottom and a convex hull wall convexly provided around the convex hull bottom, and form the counterbores into an undercut groove on an outer side wall of the convex hull wall; and step S14: performing shaping on the convex hull wall to mold the convex hull wall into a convex hull connecting portion and a convex hull ring with the convex hull ring connected to the convex hull connecting portion and bent inward; and molding the convex hull bottom and the first through hole into a terminal positioning stage and a terminal hole respectively.

2. The method for stamping and integrally molding a top cover sheet according to claim 1, wherein in the step S11, the top cover sheet is stamped to mold a second through hole arranged in a penetrating manner; in the step S12, the second through hole is stamped from bottom to top so that the second through hole is raised to form a valve hole boss; in the step S13, the top cover sheet is stamped from top to bottom to mold an electrolyte injection port; or in the step S11, the top cover sheet is stamped from bottom to top to mold an explosion-proof valve boss on the top cover sheet; in the step S13, the explosion-proof valve boss is stamped from top to bottom to stamp the explosion-proof valve boss downward to mold a valve groove portion and a side ring portion and mold a recessed ring mouth portion on the side ring portion, and the top cover sheet is stamped from top to bottom to mold the electrolyte injection port; and in the step S131, a C-shaped thinning portion is molded on the valve groove portion.

3. The method for stamping and integrally molding a top cover sheet according to claim 2, wherein in the step S14, a plurality of plastic piece concave holes are molded on a bottom surface of the top cover sheet;

in the step S14, an outer side of the convex hull connecting portion is stamped to form a concave ring; and at least three counterbores are evenly distributed along a circumference, and the first through hole is located at a center of the top surface of the cylindrical convex hull after the stamping in the step S12.

4. A method for manufacturing a top cover structure, comprising: configuring the top cover structure to comprise a top cover sheet and a positive terminal assembly or a negative terminal assembly arranged on the top cover sheet; wherein the positive terminal assembly or the negative terminal assembly comprises a seal, a terminal and an upper plastic piece, the seal, the terminal and the upper plastic piece are arranged above the top cover sheet sequentially from bottom to top, the terminal and the seal are prefabricated and then assembled to the top cover sheet, and the upper plastic piece is injection molded on the top cover sheet; step S1: performing stamping and molding to mold the top cover sheet, wherein the top cover sheet is manufactured by the method for stamping and integrally molding a top cover sheet according to claim 1;

step S2: assembling the terminal and the seal to a terminal mounting position of the top cover sheet; and step S3: performing injection molding at the terminal mounting position, and performing cooling and shaping to obtain the upper plastic piece; during the injection molding-process, applying a pressure to the terminal so that the seal is in a compression deformation state until the cooling and shaping; and a fastener is formed in an undercut groove when the upper plastic piece is injection molded.

5. The method for manufacturing a top cover structure according to claim 4, a step S21 is provided between the step S2 and the step S3, and the step S21 comprises shaping of an injection molding connecting portion at which the injection molding connecting portion is stamped inward for shaping so that a mouth size of the injection molding connecting portion is smaller than a diameter of the terminal or a convex hull ring is bent so that the mouth size of the injection molding connecting portion is smaller than the diameter of the terminal.

6. The method for manufacturing a top cover structure according to claim 5, wherein a step S31 and a step S4 are provided after the step S3;

step S31 including: assembling an explosion-proof valve at which an explosion-proof valve plate is assembled from bottom to top to an explosion-proof valve hole arranged on the top cover sheet and is welded for fixing, and then a film is attached to the explosion-proof valve hole from top to bottom; and step S4 including: assembling a lower plastic piece at which the lower plastic piece is assembled to a lower surface of the top cover sheet from bottom to top.

7. The method for manufacturing a top cover structure according to claim 6, wherein the explosion-proof valve hole comprises an explosion-proof valve boss formed by being convexly arranged relative to an upper surface of the top cover sheet, the explosion-proof valve boss is concavely provided with a first pit, and the explosion-proof valve boss is recessed relative to the upper surface of the top cover sheet for arranging the explosion-proof valve plate therein.

8. The method for manufacturing a top cover structure according to claim 6, wherein the explosion-proof valve plate is integrally molded on the top cover plate, and a periphery of the top cover plate is provided with the explosion-proof valve boss convexly arranged relative to the upper surface of the top cover sheet, the explosion-proof valve boss is provided with an exhaust groove, and the film is attached to the explosion-proof valve boss.

9. The method for manufacturing a top cover structure according to claim 6, wherein the top cover sheet is an integral top cover sheet, and one terminal mounting position is respectively arranged on both sides thereof, and the explosion-proof valve and an electrolyte injection port are provided between the two terminal mounting positions; or the top cover sheet is a split-type top cover sheet and comprises a positive electrode top cover sheet and a negative electrode top cover sheet, the positive electrode top cover sheet and the negative electrode top cover sheet are respectively provided with the positive terminal assembly and the electrolyte injection port, as well as the negative terminal assembly and the explosion-proof valve; and the lower plastic piece is arranged under the top cover sheet.

10. A battery top cover structure obtained by the method for manufacturing a top cover structure according to claim 5.

* * * * *